US005201087A

United States Patent [19]

Wickham et al.

[11] Patent Number: 5,201,087

[45] Date of Patent: Apr. 13, 1993

[54] PATIENT PRESENTATION

[76] Inventors: John E. A. Wickham, 29 Devonshire Place, London, England, W1N 1PE; Ronald A. Miller, 16 Woodland Gardens, London, England, N10 3UA

[21] Appl. No.: 626,040

[22] Filed: Dec. 12, 1990

Related U.S. Application Data

[63] Continuation-in-part of Ser. No. 314,179, Feb. 22, 1989, abandoned.

[30] Foreign Application Priority Data

Feb. 25, 1988 [GB] United Kingdom ................ 8804576

[51] Int. Cl.$^5$ ........................ A61G 13/00; B60N 2/02; A47C 7/02

[52] U.S. Cl. ........................................ 5/610; 280/647; 280/657; 297/312; 297/337; 297/355; 297/433; 5/600; 5/613

[58] Field of Search ............... 269/323, 324, 325, 328; 280/250.1, 291, 647, 650, 657; 297/312, 331, 337, 355, 366, 367, 376, 429, 433

[56] References Cited

U.S. PATENT DOCUMENTS

| | | | |
|---|---|---|---|
| 439,088 | 10/1890 | Allen | 297/337 |
| 2,295,006 | 9/1942 | Philips | 269/325 |
| 4,191,397 | 3/1980 | Kassai | 280/647 |
| 4,593,929 | 6/1986 | Williams | 280/650 |
| 4,598,921 | 7/1986 | Fenwick | 280/657 |
| 4,966,413 | 10/1990 | Palarski | 297/312 |

FOREIGN PATENT DOCUMENTS

| | | | |
|---|---|---|---|
| 1175684 | 12/1969 | United Kingdom | 280/647 |

*Primary Examiner*—J. J. Swann
*Attorney, Agent, or Firm*—Reese Taylor

[57] ABSTRACT

In order to present patients in the correct position for surgical or investigative procedures and in order to reduce the time required to place on and remove from operating surfaces on which such procedures are carried out on patients, a wheelchair of novel configuration is described. The wheelchair has a seating arrangement comprising a back rest portion, a seat portion and foot rest means, adapted to receive a patient in a semi-recumbent or sitting position. The seating arrangement can be tilted so that the back rest portion is substantially horizontal and the seat portion is divided so that the patient's legs can be moved apart, while still supported, to present the patient's ano-genital region for surgical or investigative procedures.

11 Claims, 11 Drawing Sheets

PATIENT PRESENTATION

RELATED PATENT APPLICATIONS

This application is a continuation-in-part of applicants' earlier filed application Ser. No. 314,179, filed Feb. 22, 1989, now abandoned.

FIELD OF THE INVENTION

This invention relates to the presentation of patients for surgical and investigative procedures, especially but not solely for renal endoscopic procedures, and is particularly concerned with a wheelchair in which a patient can be sat and subsequently presented in a suitable position for a surgical or investigative procedure. The invention is also concerned with a surgical or investigative work station at which a surgeon may be seated and at which a patient in the wheelchair can be presented for a surgical or investigative procedure.

BACKGROUND OF THE INVENTION

While many surgical and investigative procedures involving the use of endoscopes inserted through a natural orifice or a percutaneous access site may take only a short time to conduct, a considerable amount of time is taken in removing the patient from a hospital trolley and placing him or her on an operating surface and then reversing this procedure at the end of the surgery or investigation. Indeed, up to 70% of the time may represent patient handling and only 30% is devoted to the surgical or investigative procedure.

BRIEF SUMMARY OF THE INVENTION

According to one aspect of the present invention there is provided a wheelchair comprising a frame, wheels on said frame, a back rest portion mounted on said frame for pivotal movement from a normal upright inclined position to a substantially horizontal position, a central seat portion pivotable about a horizontal axis located adjacent the lower end of the back rest portion, two outer seat portions arranged one on each side of said central seat portion, means pivotally supporting said outer seat portions for movement toward and away from said central seat portion about axes located near the back rest portion, two foot rests, and means supporting a foot rest and attaching it to a respective outer seat portion, the wheelchair being disposed such that a patient can be received in the wheelchair in a semi-recumbent position and the back rest portion and seat portions can be tilted to present the back of a patient in a horizontal position with the patient's legs at a higher level than the patient's head, whereafter the central seat portion can be pivoted downwardly and the outer seat portions pivotted outwardly to present the patient in a position for an ano-reno-genito surgical or investigative procedure.

Each outer seat portion and an associated foot rest attached thereto may constitute a leg support portion with the attachment of the foot rest to the seat portion lying at an obtuse angle to the underside of the seat portion.

Because the back rest portion and the foot rest attachment both lie at an obtuse angle to the seat portion, the position of the patient relative to these portions does not substantially alter when the patient is tilted from a normal semi-upright or rest position into the operative position. The obtuse angles which the back rest portion and foot rest attachment make with the seat portion will normally lie within the range of 100° to 140°. It may be desirable to make the back rest portion and foot rest means adjustable relative to the seat portion so that the angles and positions can be adjusted to accommodate patients of different sizes or proportions, but in most cases such adjustment will be unnecessary and a similar effect might be obtained, for instance, by placing a small cushion in the small of the patient's back.

The arrangement and disposition of the wheels, by which the wheelchair is mobile, may take many forms. In one embodiment, a pair of large diameter wheels is mounted on an axle beneath the seat portion so as to constitute a wheeled frame and the wheels may have hand rings whereby the patient can propel the wheelchair. In this case, a stabilizing wheel or wheels is or are provided and may conveniently be arranged on an arm which depends below the back rest portion and can be folded up to the back rest portion when the chair is tilted into the operative position. The arm, in its folded position, may act as a rest or stop holding the back rest portion in the substantially horizontal operative position or a separate rest or stop may be provided. In a preferred embodiment the back rest portion has attached to it a handle by which a hospital porter or nurse can move the wheelchair and this handle may act as a rest or stop for the backrest portion in the operative position.

In another embodiment of the wheelchair, the chair portions are pivotally mounted on a wheeled undercarriage so that the chair can be tilted from the rest position to the operative position. Preferably means are provided for locking the chair in each of these positions.

If the present chair is to be used in ano-reno-uro-genito-endoscopic procedures, it is necessary to present the patient to the surgeon with the legs of the patient wide apart and with a space between them so that the surgeon can approach the patient. To this end the outer seat portions and associated foot rests are pivotally mounted so that when the chair is in or being moved into the operative position the patient's legs can be parted. The wheelchair may be equipped with means for spreading the outer seat portions apart. The means for spreading the supports apart may be manually operated and include a hand lever or hand wheel, or in a more sophisticated embodiment a lever system may be provided for automatically spreading the outer seat ports apart as the wheelchair is moved from the rest position to the operative position. However, in this case it is desirable to have a manual override to prevent undue stress on elderly patients or patients with no or with restricted hip mobility.

Since it is the intention that the present wheelchair will be used to wheel a patient from a ward or waiting area to an operating or investigating station, it is clear that the wheelchair will not be sterile. Nevertheless, it is important that the wheelchair and in particular the chair portion supporting a patient should be made of or covered with materials which are capable of withstanding washing with disinfectants. Preferably, the wheels and framework of the wheelchair are made of aluminum alloys or even stainless steel, and the chair portions are covered with rubber or plastics, which can be washed with disinfectants, even though the patient will normally sit on a washable or disposable cover laid on the chair.

In the use of the chair, a patient is placed on the chair either in a hospital ward, or, if the patient is an ambulant day-patient, in a waiting area, and is then wheeled to an operating station. On arrival at the operating station, the wheelchair is tilted and the patient is presented to the surgeon in the correct position for an endoscopic surgical or investigative procedure to be carried out. At the end of the procedure, the chair is tilted back to the semi-recumbent rest position and wheeled away, whereupon the next patient can be wheeled up to the operating station so that there is no waste of the surgeon's time at the operating station.

It will be appreciated that apart from operations and investigations conducted in the ano-genital area of a patient, similar endoscopic investigations and operations can be conducted at the head and chest of a patient. Of course, in conducting the latter procedures it is not necessary for the patient's legs to be spread apart and in consequence a simpler version of the wheelchair is suitable for such procedures. In an alternative embodiment of the wheelchair, the back rest portion, seat portion and a leg support portion or portions are mounted so that they can lie substantially flush with one another so as to provide a flat surface to receive a patient in a prone position.

As just indicated, the purpose of the wheelchair is to present the patient at an operating station where operative and investigative procedures can be carried out. It is a further and concomitant object of the present invention to provide such an operating station.

Accordingly, a further aspect of the present invention provides an operating station at which operative or investigative procedures can be carried out on a patient, comprising means to accommodate a surgeon in a sitting position, a work table in front of said means, a first work station to one side of said means for receiving sterile instruments and materials for use in an operative or investigative procedure, a second work station to the other side of said means for receiving used instruments and materials, and means for receiving the present wheelchair the work table and work stations being so shaped and located that when the wheelchair indicated above is wheeled up adjacent the station, the region of the patient to be operated on or investigated is presented at said work table.

Thus, when the ano-genital region of a patient is to be operated on or investigated, that region will be presented at the work table and the surgeon will be seated with the patient's legs on each side of him, the work table being appropriately shaped to lie between the two leg supports of the wheelchair.

In order to present the patient at the right height to the surgeon it may be necessary either to use a split-level operating theatre or to sit the surgeon in a well. However, a more convenient arrangement will be to provide a hydraulic or other lift to which the wheelchair can be firmly attached and then raised to the correct height for the appropriate procedure.

With the present operating station and wheelchair, a surgeon sitting at the operating station can carry out a large number of operative or investigative procedures in a fraction of the time normally entailed in such procedures, most of which is represented by the time taken to remove the patient from a hospital trolley to an operating surface and back again.

Thus with the present invention, the surgeons time is more usefully employed, as are expensive hospital resources, with a consequent reduction in hospital waiting lists.

DETAILED DESCRIPTION OF THE INVENTION

Figure 1:
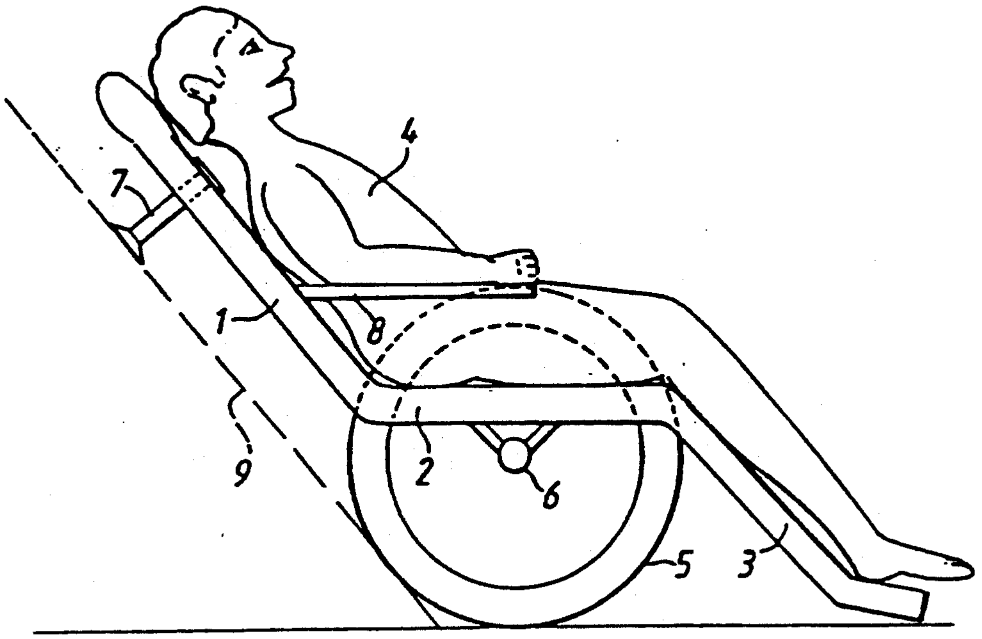
FIG. 1 is a simplified schematic representation (side view) of a wheelchair in accordance with the invention.

The basic principle of the wheelchair of the present invention will first be described with reference to FIG. 1 which is a diagrammatic representation of a patient in a wheelchair. The wheelchair shown in FIG. 1 comprises a back rest portion 1, a seat portion 2 and two leg supports 3. The back rest portion 1 lies at an obtuse angle of about 130° to the seat portion 2 and the leg supports 3 also lie at an obtuse angle of about 130° to the seat portion. Because of these angles, the patient 4 is presented in the wheelchair in a semi-recumbent and relaxed position. The wheelchair has a pair of large diameter wheels 5 mounted on an axle 6 beneath the seat portion and the wheels may have hand rings whereby the patient can propel the chair, although these will generally be unnecessary. A stabilizing wheel or wheels is or are provided for the wheelchair but not shown in the drawing. A stabilizing wheel may be arranged on an arm which depends below the back rest portion and which can be folded flat against the back rest portion when the chair is tilted into an operative position, or stabilizing wheels may be arranged on an axle mounted below the leg supports 3.

The back rest portion 1 is provided with a handle 7 by means of which a hospital porter or nurse can hold the wheelchair to move it and the handle can act as a rest or stop in the operative position. In addition arm rests 8 for the patient may be provided.

In the use of the wheelchair, the patient is placed in the chair or enters it by himself if ambulant and, after the administration of any necessary pre-operative medication, is wheeled to the location where the endoscopic procedure is to be carried out. The chair is then tipped so that the handle is on the ground, i.e. so that the broken line 9 is the ground. The patient is then presented in an appropriate position for the endoscopic procedure, with his head and back horizontal and his legs raised. The patient's legs can then be moved apart to permit the surgeon to operate.

Figure 2:
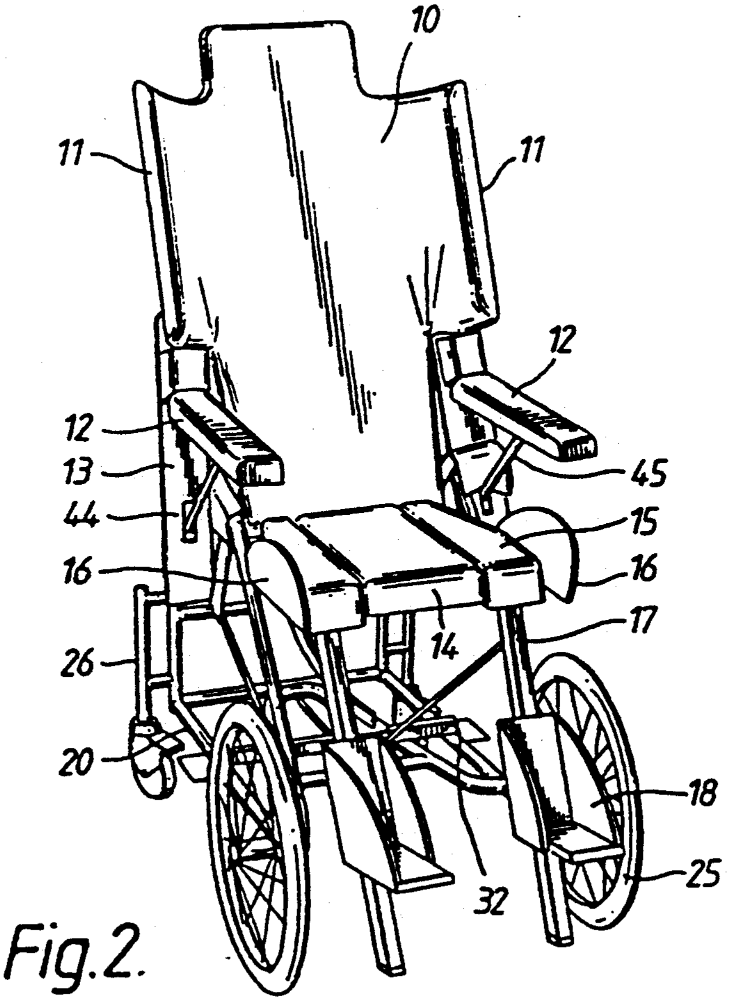
FIG. 2 is a perspective view of a first embodiment of a wheelchair in accordance with the invention.
Figure 3:
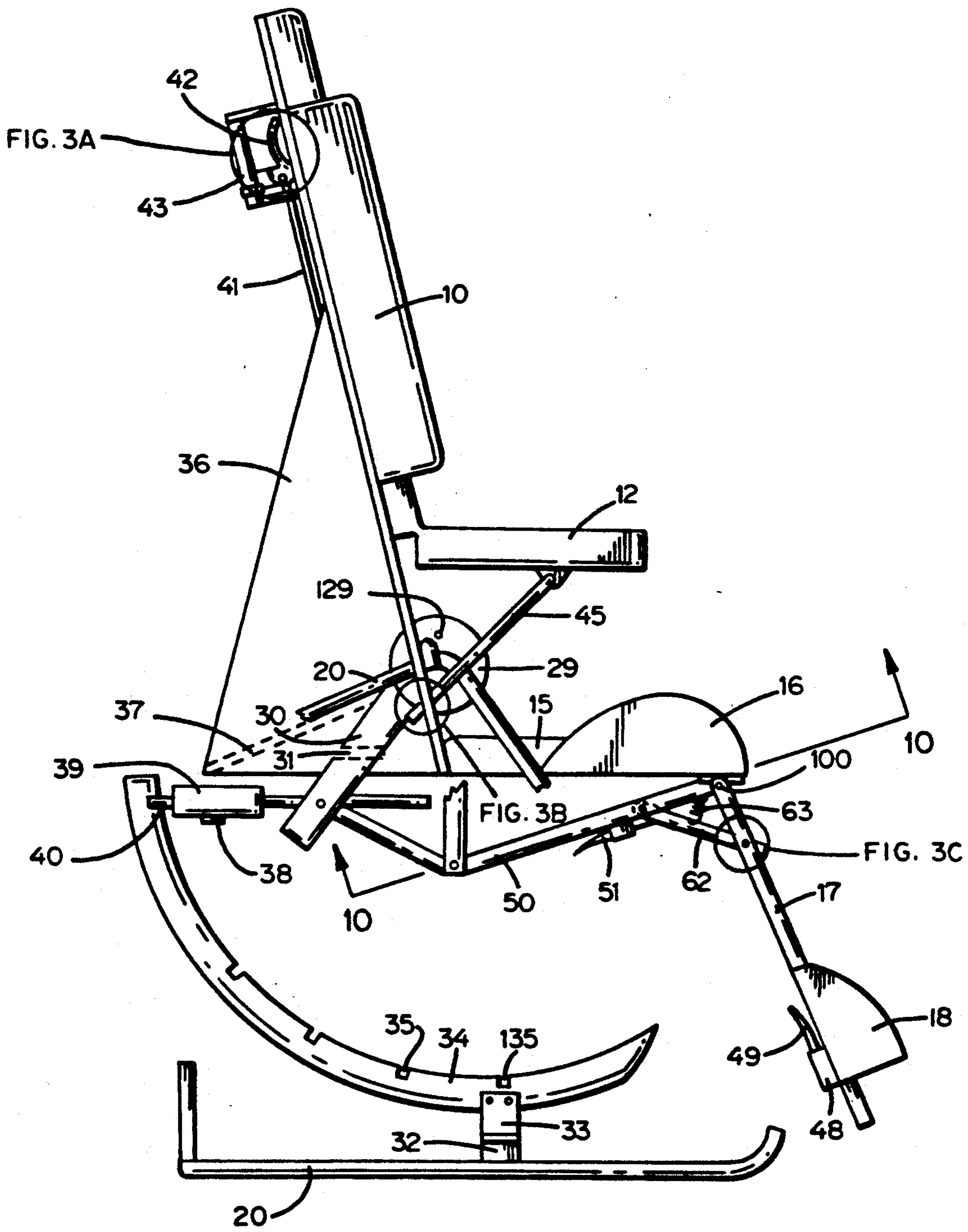
FIG. 3 is a side view of the wheelchair of FIG. 2 showing the mechanism by which the seat can be swung and locked in different positions.
Figure 4:
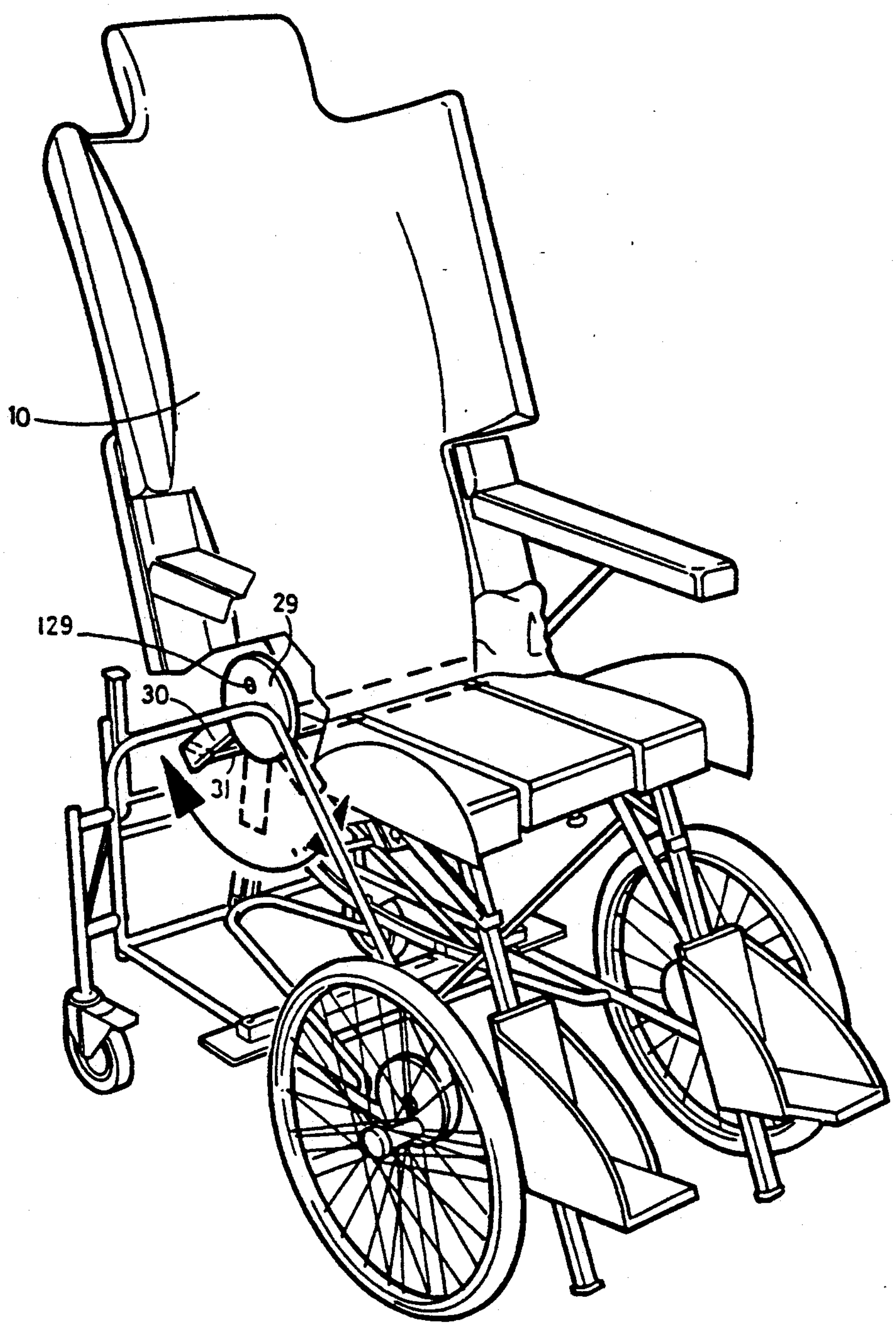
FIG. 4 is a further perspective view of the wheelchair of FIG. 2 showing how the seat is mounted for pivotal movement on the wheeled frame.
Figure 5:
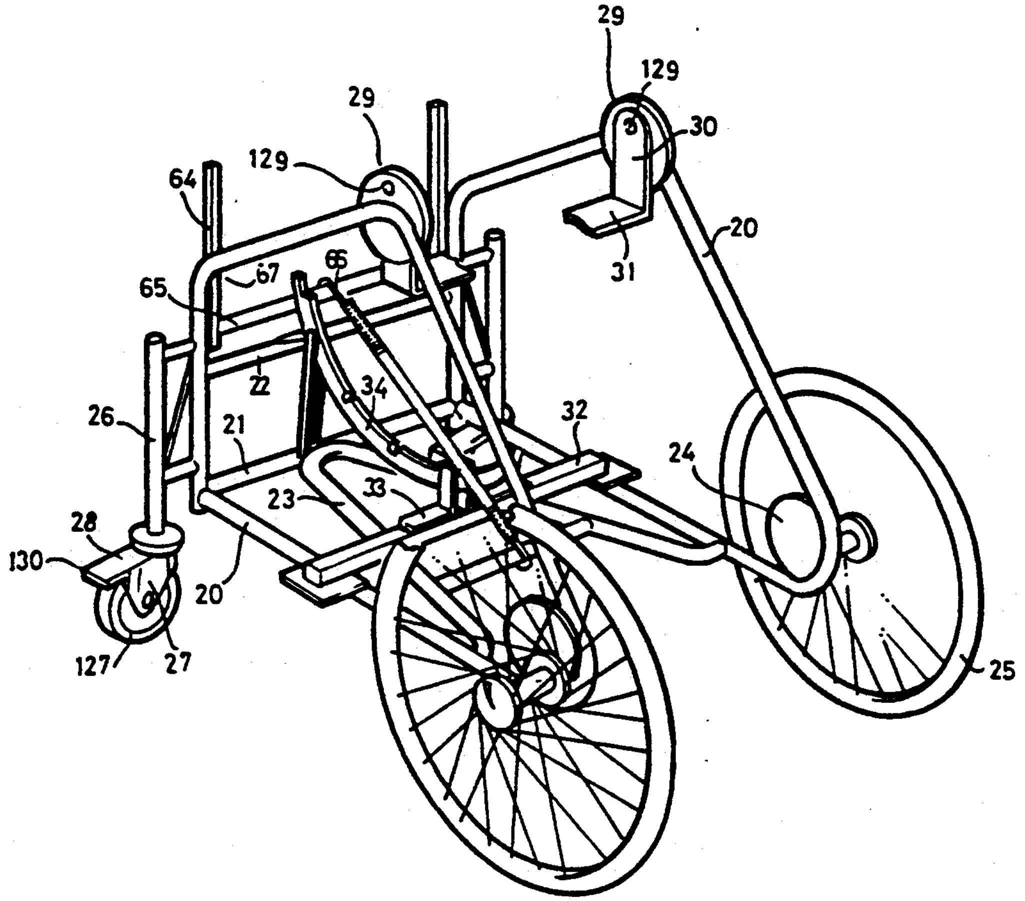
FIG. 5 is a perspective view of the wheeled frame of the wheelchair of FIG. 2.

A practical version of a wheelchair in accordance with the invention will now be described with reference to FIGS. 2 to 9. Although FIG. 2 is a perspective view of the wheelchair, because of the manner in which the wheelchair is constructed, no one view can begin to show all the features of the wheelchair. The wheelchair will therefore be described with reference to several views of the wheelchair which can be clearly related to one another. In each view, several parts of the wheelchair are omitted so as to prevent them from obscuring the view, the omitted parts, however, being shown in another view. Thus, FIG. 3 shows a wheeled frame for the wheelchair, while FIG. 2 shows the seating and patient-receiving parts of the chair in relation to the wheeled frame. FIGS. 4 and 5 show detailed views of the mechanisms by which the seating and patient receiving parts of the chair can be arranged in different configurations and show the relationship of these mechanisms to the wheeled frame. FIGS. 6 to 9 show further details of the wheelchair.

Referring now to FIG. 2, there is shown the seating part of the chair, that is to say, the part for receiving a patient, this part being mounted on a wheeled frame shown in FIG. 3.

The wheelchair comprises a back rest portion 10, the sides 11 of which are rounded outwardly to give side support to a patient. Two arm rests 12 are provided below the sides 11 and are shown in position to receive the arms of a patient sitting in the chair. Each arm rest 12 can be folded to lie flat against a board 13 forming part of a support structure for the back rest portion the arm rests in their folded position lying flush with the lower part of the back rest portion.

The wheelchair also has a seat portion which is divided into a central portion 14 and two side portions 15. The central portion 14 is carried by two arms 114 which are mounted on a rod 115 rotatably mounted in brackets 116 of a support structure to be described, so that the central portion can be swung about the axis of the rod 115 (c.f. FIG. 5). Each of the side portions 15 has an arcuate retaining board 16 to prevent the legs of a patient from slipping outwardly off the seat. Each side portion 15 has a square section bar 17 attached to it and each bar has a foot rest 18 mounted on it so as to be adjustable up and down. The bars 17 will normally extend forward of the seat portion with the foot rests raised above the ground. However, the bars are mounted beneath the side portions 15 so that they can be moved into a position where they extend substantially vertical so that the foot rests can be lowered into contact with the ground to assist the entry of a patient into the wheelchair. The back rest portion 10, the arm rests, the central and side seat portions and the foot supports are padded, where appropriate, and covered with plastics material capable of withstanding being washed with disinfectant. Conveniently, the plastics material may be one which simulates leather.

Figure 6:
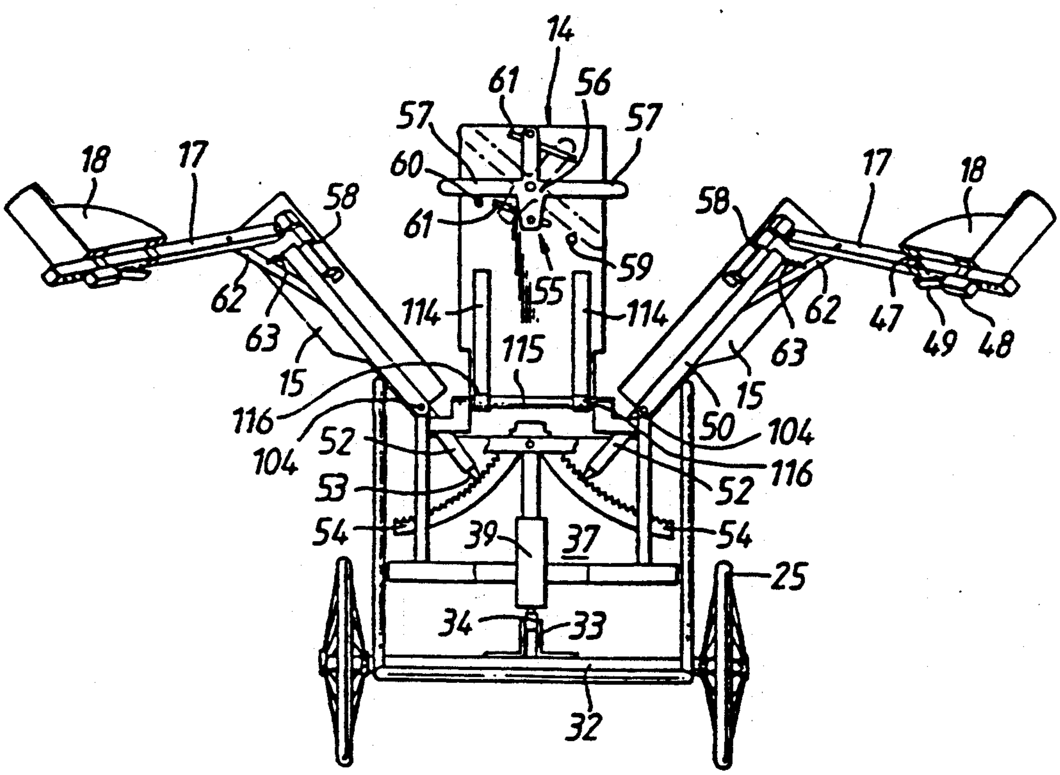
FIG. 6 is a front view of the wheelchair of FIG. 2, with the seat in position for an investigative or operative procedure.

FIG. 3 shows a wheeled frame for the wheelchair. The frame comprises two substantially D-shaped side members 20 which are joined at the bottom and near the top of the upright portions of the side members by cross-members 21 and 22 and at the bottom by a substantially A-shaped member 23 the apex of which also connects with the lower cross-member 21. At their forward ends the side members 20 have support discs 24 which support stub axles for spoked wheels 25. Outrigger rods 26 attached to the upright portions of the side members 20 carry at their lower ends castor wheels 127 which have foot-operable brake elements 28. Each brake element 28 comprises an upper plate 130 to which is attached a braking block 128 pivoted at 131 in a bracket 27 housing the castor wheel 127. Operation of the brake is by depressing the free end of the upper plate 130 and this causes the braking block 128 to engage the wheel 127 and brake it as shown in FIG. 6. At their uppermost regions, the side members 20 have discs 29 secured thereto and two arms 30 are pivotally mounted on the discs at 129 and hang downwardly. The arms 30 are joined by a member, indicated at 31, which is joined to the support structure for the back rest portion, so that the back rest portion is thereby mounted for swinging movement about an axis joining the pivot points 129 of the arms 30 on the discs 29.

FIG. 4 shows the mechanism by which the chair can be swung and locked in different positions and the mechanisms for enabling the arm rests 12 to be folded and the foot rests to be adjusted. The frames 20 and the member 23 support a cross-beam 32 which has two L-shaped brackets 33 fixed to it in opposition to one another. The brackets define between them a space in the mid-plane of the wheelchair and a quadrant 34 is held securely between the brackets, the quadrant being formed with rectangular recesses 35. The quadrant could also be formed with ratchet teeth.

Figure 7:
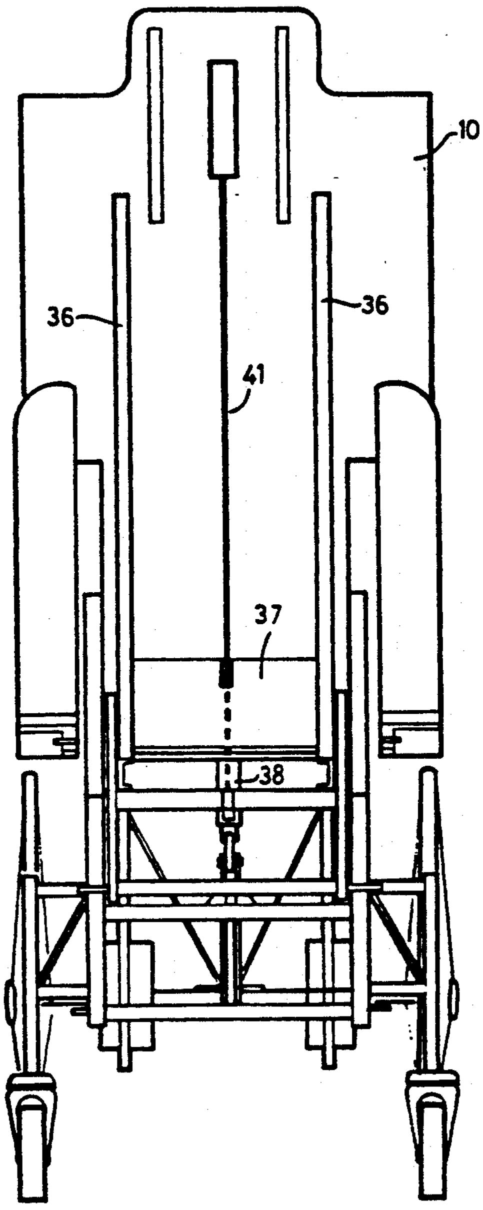
FIG. 7 is a rear view of the wheelchair of FIG. 2, with the seat in an upright position.

A wooden support structure for the back rest portion 10 includes two triangular wings 36 which are spaced apart and which are joined at their lower ends by a base board 37 (c.f. FIG. 5). Beneath the base board is a cruciform member 38 one arm 39 of which carries a spring-loaded detent 40 engaging in one of the recesses 35. The detent 40 is held in a T-shaped slot in the arm 39 and has a depending lug 140 received in the stem of the T-shaped slot. The detent 40 is urged into engagement with the quadrant 34 or a recess 35 by a compression spring 141 (c.f. FIG. 7) housed in a recess 139 in the arm 39. A cable connection 41 comprises a sheath 142 held stationary in a block 143 and a wire 144 movable in the sheath by means of a hand lever 42 to which the wire 144 is connected. The hand lever 42 is mounted on a handle 43 by means of which a porter or nurse can move the chair.

By operating the hand lever 42, the wire 144 is moved in the sheath and acts on the lug 140 to retract the detent 40 into the T-shaped slot into the position shown in FIG. 7. This operation moves the detent 40 out of a recess 35 and, in this position, the parts of the chair, comprising the back rest portion 10, the seat portion 14 and 15 and the leg supports 17 and 18, can be swung on the arms 30 and joining member 31 about an axis joining the pivot points 129 until the detent encounters the next recess. Upon release of the hand lever 42, the detent 40 is then urged into the recess 35 by the spring 141 so that the chair will be locked in this position.

As indicated in FIG. 2, the boards 13 are formed with slots 44 and support bars 45 pivotally attached to the undersides of the arm rests 12 pass through the slots where each support bar is held by the engagement of a bayonet slot 46 in the arm 45 and a rod 101 extending across the slot 44. In order to fold the arm rests flat, the bars 45 are lifted to disengage the bayonet slots from engagement with the rods and then the bars 45 are passed through the slots 44 to allow the arm rests to lie flush against the boards.

Each square section bar 17 is formed on its underside with holes 47 (c.f. FIG. 5) and each foot rest 18 has attached to it a locking mechanism 48 which comprises a spring-loaded pin engaging in a hole 47 in the bar 17 and thus locking the foot rest in position. A handle 49 of the locking mechanism can be operated to retract the pin and allow the foot rest to be moved up or down the bar to adjust the foot rest to the required position for a patient.

Beneath each side seat portion 15 is a support structure of bars which extend below the base board of the wooden support structure. One of these bars 50 for each side seat portion carries a hand lever 51 for operating a cable connection comprising a sheath 150 held stationary in a block 151 and a wire 152 movable in the sheath by the hand lever 51, as shown in greater detail in FIG. 8.

Figure 8:
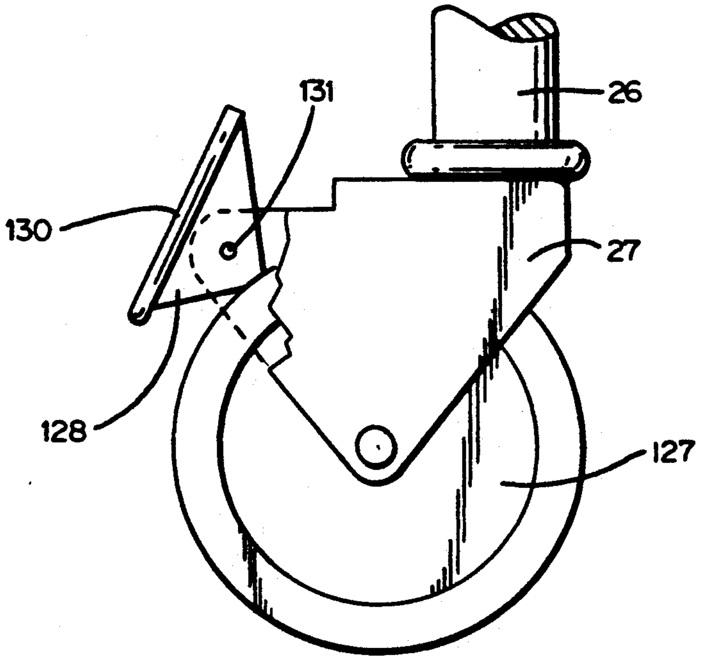
FIG. 8 is a side view of a caster wheel of the wheelchair of FIG. 2.

Each side seat portion 15 has mounted beneath it a hollow beam 52 within which is a rod 153 acting as a detent. Each rod 153, as shown in FIG. 8, has a pointed end 53 which engages in a toothed quadrant 54, two such quadrants being mounted below the base board.

Each rod 153 is urged by a spring 154, housed in the hollow beam 52, into engagement with the toothed quadrant. However, operation of the hand lever 51 causes the wire 152 to be moved in the sheath 150 so as to pull the rod 153 against the action of the spring 154 so as to retract the pointed end 53 of the rod from engagement with the quadrant 54. This allows the side seat portion 15 and foot rest 18 to be swung from a closed position, as shown in FIG. 2 where the side seat portions 15 abut against the central seat portion 14, to an open position as shown in FIG. 5, and vice versa.

Underneath the central seat portion 14 there is a cruciform member 55 which is pivotally mounted on a central pivot 56 and which has two arms 57 which project beyond the seat portion 14 to engage in U-section brackets 58 on the underneath of the side seat portions 15, so as to prevent pivotal motion of one seat portion 14 or 15 in relation to another seat portion. In order to release the seat portions, the cruciform member is pivoted into the position shown in broken lines. The underneath of the central seat portion is also provided with stops 59 and 60 to limit the movement of the member 55 and with guideways 61 for controlling the movement of the ends of the other two arms.

The square section bars 17, on which the foot rests 18 are mounted, are normally held in the forward position shown in FIG. 4 by the engagement of a recess in a bar 62 in a bolt projecting through the bar 17, the bar 62 being urged into such engagement by a spring 63. By disengaging by hand the bar 62, the bar 17 can be moved into the vertical in FIG. 4 to facilitate entry into the wheelchair as will already described.

Figure 9:
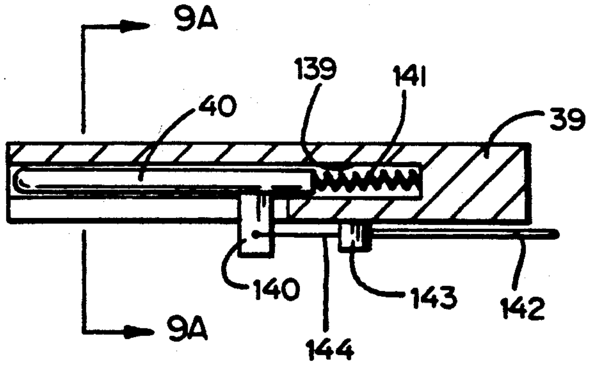
FIG. 9 is a sectional view of the locking and release means for pivotal movement of the seat of the wheelchair of FIG. 2.

In operative procedures carried out under anaesthetic where the patient is in a recumbent position, it would be desirable in an emergency to be able to lower the patient's head below the rest of his body so as to prevent, for example, the patient from swallowing or inhaling his own vomit. Therefore in a modification of the wheelchair a frame comprising two uprights 64 and a cross-beam 65 is pivotally mounted to the rear of the two D-shaped side members 20 as shown in FIG. 9. The frame is normally held in the position shown by a spring 66, one end of which is looped over the cross-beam 65 and the other end of which is looped over a convenient fixed point, such as the cross-bar of the A-shaped member 23. When the wheelchair is in the recumbent or operating position, the back of the back rest portion will rest against the upper ends of the uprights. However, in an emergency an anaesthetist can grab the cross-beam 65 and pull it against the action of the spring 66 thereby pivoting the uprights 64 about their pivotal connections 67 to the members 20 an lowering their upper ends. This allows the back rest portion to pivot to lower the head of the patient and the pivotal movement may be as much as 15°.

In the use of the wheelchair, each of the bars 17 is moved from the position shown in FIG. 4 into a position where it extends substantially vertically by disengaging the recess in the bar 62 from the bolt projecting through the bar 17 so that the bar can swing about a pivot 100 under the influence of gravity. The handle 49 is operated to retract the locking mechanism 48 from engaging in a hole 47 so that the foot rest can be moved down the bar 17 into contact with the ground.

A patient then enters the wheelchair and when he or she is settled, the foot rests are raised to the correct level to accommodate the patient's feet and the bars 17 are moved into their forward positions in which they are locked by engagement of the recesses in the bars 62 with the bolts.

The chair is then wheeled to the operating theatre. The hand lever 42 is operated to move the cable connection 41 which acts on the detent 40 to retract the detent from engagement in the recess 35. The whole seat portion can then be swung by hand about the pivot axes of the arms 30 on the discs 29 until the back rest portion 10 lies substantially horizontal, whereupon the hand lever 42 is released and the detent 40 enters the recess 135 shown in FIG. 4. The bayonet slots 46 are then released from engagement with the rods 101 and the arm rests 12 are folded flush with the back rest portion.

The cruciform member 55 which is pivotally mounted beneath the central seat portion 14 is then swung about its pivot 56 to release the ends of the arms 57 from engagement with the U-section brackets 58 on the underside of the seat portions 15 so that the central seat portion can be lowered by being swung about the axis of the rod 115.

The hand levers 51 are then operated and each lever acts on the cable connection shown in FIG. 8 to withdraw the pointed ends of the rods 53 from the teeth of the quadrants 54 so that the side seat portions can be swung outwardly about pivot joints 104. The patient's legs are thus spread apart and the patient is now presented in the correct position for a surgical or investigative procedure.

At the end of the procedure, the side seat portions 15, bars 17 and foot rests 18 are swung back to their original position, the central seat portion 14 is raised and locked in position, and the chair is then moved to raise the patient from a recumbent position to an upright sitting position, all following the reverse of the procedures just described. The patient is then wheeled away.

It is to be appreciated that many other modifications of the wheelchair and its construction are possible and that alternative mechanisms to those described can be provided for moving or permitting movement of the various parts of the seating arrangement. For example, the wheels 25 could be replaced by castors similar to the castors 27, or the wheelchair could be provided with two separate handles for pushing the chair, with the various hand levers for moving the parts of the seating arrangement and for braking mounted on the handles.

While the wheelchair has been shown as having hand levers for moving or permitting movement of the various parts and mechanisms of the wheelchair, it will be appreciated that the various mechanisms can be electronically controlled and in such a case a panel of push buttons or the like will be placed on the handle or in another convenient location.

As clearly shown in FIG. 2, the back rest portion 10 has at its upper end an integral portion against which a patient's head can rest. In a further modification of the wheelchair, this head rest portion can be movable and pivotable about an horizontal axis, there being means to lock the head rest portion in a pivoted position. This enables a patient's head to be raised or lowered (extended), particularly when the patient is in a prone position.

In addition, in a further modification of the wheelchair it is possible to pivot the whole of the seat portion relative to the back rest portion and to move the bars 17 and foot rests 18 so as to provide a flat surface to receive a patient in a prone position.

As indicated above, the wheelchair is particularly suitable for presenting a patient at an operating station at which an operative or investigative procedure can be carried out endoscopically on a patient. Such an operating station is shown very diagrammatically in FIG. 10 and comprises means 70 for accommodating a surgeon in a sitting position with a work station on each side, one for receiving or holding sterile instruments and materials for use in an operative or investigative procedure and the other 72 for receiving used instruments and materials. A work table 73 is provided in front of the surgeon and there is a wheelchair-receiving region 74 at which is means 75 for accommodating an anaesthetist. The arrangement of the seating means, work table and work stations is such that when the wheelchair is brought up to the operating station, the region of the patient to be operated on or investigated is correctly presented at the work table. To this end it may be necessary to seat the surgeon in a well, or to arrange for the wheelchair to be raised either by wheeling it up a ramp to a level position or by elevating the wheelchair as by means of a hydraulic lift. In each case, means is provided for locking the wheelchair adjacent the work table.

What we claim is:

1. A wheelchair comprising a frame;

wheels on said frame, a back rest portion mounted on said frame for pivotal movement from a normal upright inclined position to a substantially horizontal position, a central seat portion mounted on said frame and pivotable about a horizontal axis located adjacent the lower end of the back rest portion from a normally substantially horizontal position to a substantially vertical position, two outer seat portions disposed one on each side of said central seat portion and each being pivotally attached to said frame, means pivotally supporting, said outer seat portions for movement toward and away from said central seat portion about first and second axes located near the back rest portion, said first axis extending substantially coextensively with the pivoting axis of said central seat portion and said second axis extending substantially normal thereto, two foot rests each connected to said outer seat portions, and means supporting each said foot rest and attaching it to a respective outer seat portion, said means for supporting and attaching each said foot rest being swingable from a position substantially normal to the plane of said central seat portion in its substantially horizontal position to a position above and outboard of said plane, the wheelchair being movable from a position in which a patient can be received in the wheelchair in a semi-recumbent position and the back rest portion and seat portions can be tilted to present the back of a patient in a horizontal position with the patient's legs at a higher level than the patient's head, whereafter the central seat portion can be pivoted downwardly and the outer seat portions pivotted outwardly to present the patient in a position for an ano-reno-genito surgical or investigative procedure.

2. The wheelchair of claim 1 and further including arm rests attached to said frame for the patient's arms when the patient is in a semi-recumbent position, the arm rests being mounted to be folded to lie substantially in the plane of the back rest portion.

3. The wheelchair of either claim 1 or 2, and further including a quadrant mounted on said frame below said back rest and seat portions and formed with recesses or teeth, a spring-loaded detent mounted on said back rest portion and extending therefrom and engageable in said recesses or teeth, and hand-operable means for moving said detent out of engagement with a recess or the teeth to permit the back rest and seat portions to pivot.

4. The wheelchair of claim 3, and further comprising second and third toothed quadrants, one for each outer seat portion mounted on said frame, a spring-loaded detent rod extending from each outer seat portion and engaging the teeth of an associated quadrant, and hand-operable means for moving a detent rod out of engagement with said teeth to permit the associated outer seat portion to pivot.

5. The wheelchair of claim 1, wherein said means for supporting and attaching each said foot rest includes an elongate support member and wherein each said foot rest is adjustably mounted on its support member for selective positioning along the longitudinal axis of said elongate support member.

6. The wheelchair of claim 1, and further comprising support means mounted on said frame for supporting the head end of said back rest portion when the latter is lying in its substantially horizontal position, means pivotally mounting said support means on said frame, and spring means interconnecting said support means and said frame and normally holding said support means in place in a substantially upright position, said support means being movable by hand against the action of said spring means to permit the head of a patient to be lowered.

7. The wheelchair of claim 1, wherein said back rest portion, said seat portions and said foot rest supporting and attaching means are pivotally mounted so that they can be moved to provide a flat surface to receive a patient in a prone position with said back rest portion, said seat portions and said foot rest supporting and attaching means lying in a common plane.

8. The wheelchair of claim 3, wherein the means for supporting and attaching each said foot rest includes a support member and wherein the foot rest is adjustably mounted on its support member.

9. The wheelchair of claim 3, and further comprising support means mounted on said frame for supporting the head end of said back rest portion when the latter is lying in its substantially horizontal position, means pivotally mounting said support means on said frame, and spring means interconnecting said support means and said frame and normally holding said support means in a substantially upright position, said support means being movable by hand against the action of said spring means to permit the head of a patient to be lowered.

10. The wheelchair of claim 4 wherein said means for supporting and attaching each said foot rest includes an elongate support member and wherein each said foot rest is adjustably mounted on its support member for selective positioning along the longitudinal axis of said elongate support member.

11. The wheelchair of claim 4, and further comprising support means mounted on said frame for supporting the head end of said back rest portion when the latter is lying in its substantially horizontal position, means pivotally mounting said support means on said frame, and spring means interconnecting said support means and said frame and normally holding said support means in place in a substantially upright position, said support means being movable by hand against the action of said spring means to permit the head of a patient to be lowered.

* * * * *

UNITED STATES PATENT AND TRADEMARK OFFICE

CERTIFICATE OF CORRECTION

PATENT NO. : 5,201,087

DATED : April 13, 1993

INVENTOR(S) : John E. A. Wickham et al.

Figure 3A:
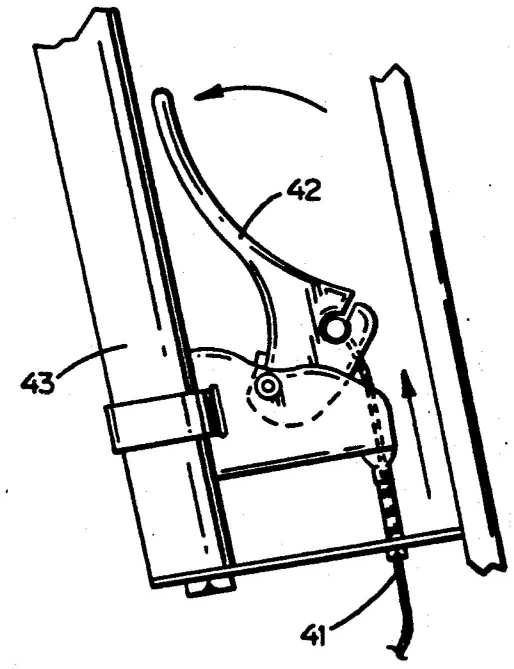
Figure 3B:
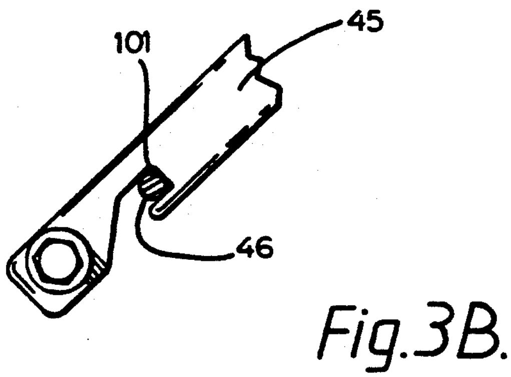
Figure 3C:
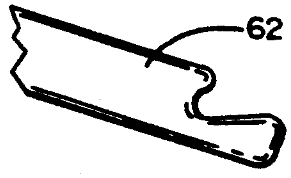

It is certified that error appears in the above-identified patent and that said Letters Patent is hereby corrected as shown below:

In Column 4, between lines 13 and 14, insert the following:

---Figure 3A is an enlarged area of that portion of Figure 3 defined generally by a circle and identified as "Fig. 3A.";

Figure 3B is an enlarged area of that portion of Figure 3 defined generally by the circle designated as "Fig. 3B";

Figure 3C is an enlarged area of that portion of Figure 3 defined generally by the circle designated as "Fig. 3C";---.

Figure 9A:
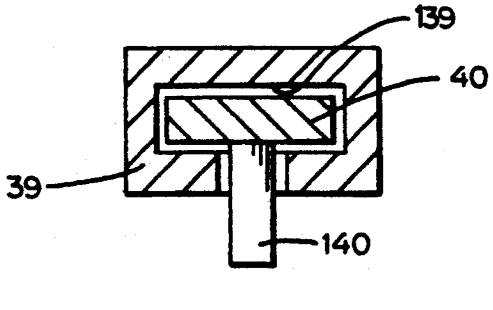

In Column 4, between lines 28 and 29, insert the following:

---Figure 9A is a view taken along the line 9A-9A of Figure 9;---.

Figure 10:
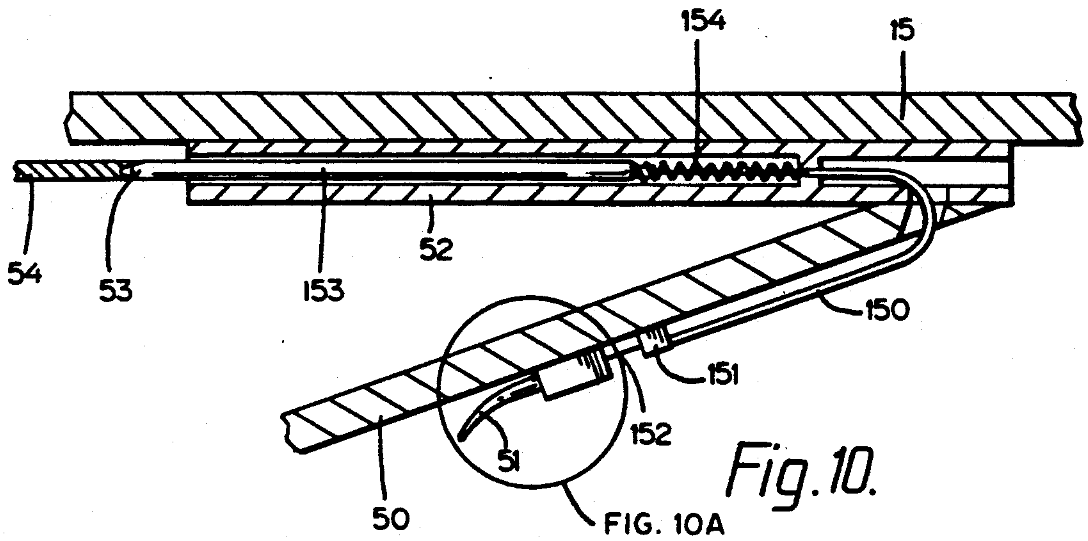
FIG. 10 is a sectional view of the locking and release means for the side portions of the seat of the wheelchair of FIG. 2.
Figure 10A:
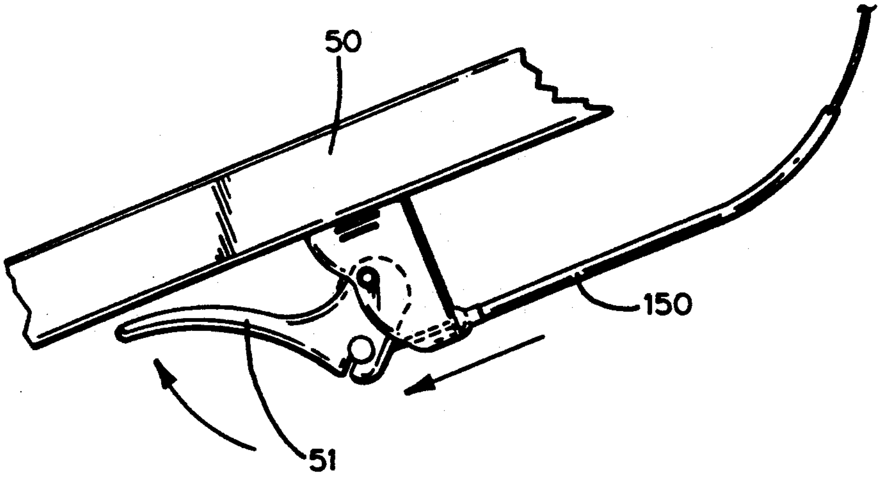
Figure 11:
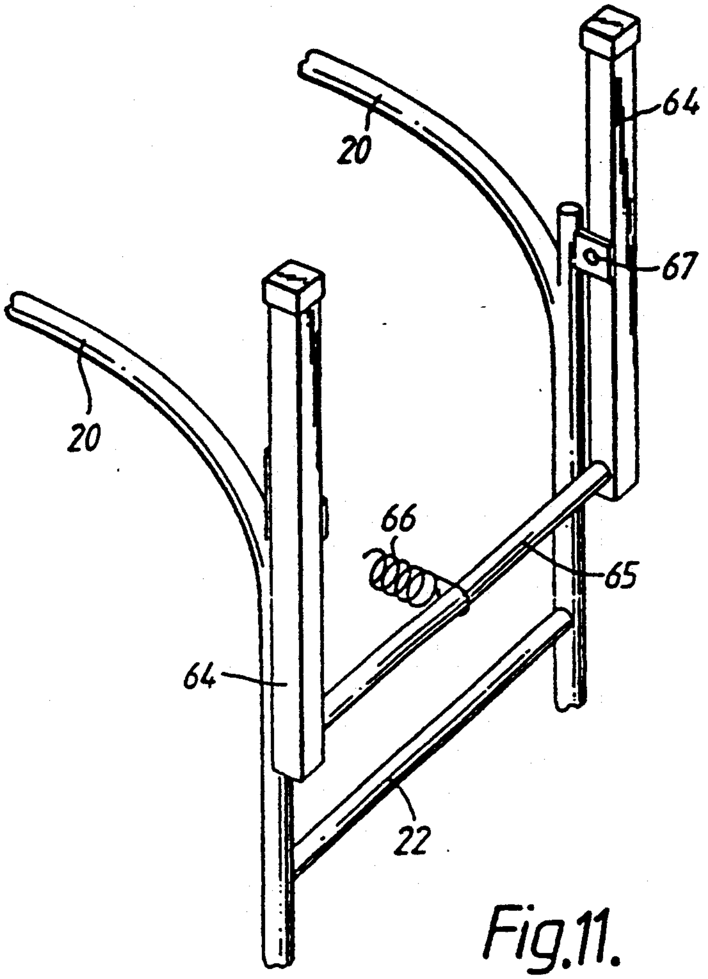
FIG. 11 is a perspective view of a detail of the wheelchair of FIG. 2 for use during an emergency.
Figure 12:
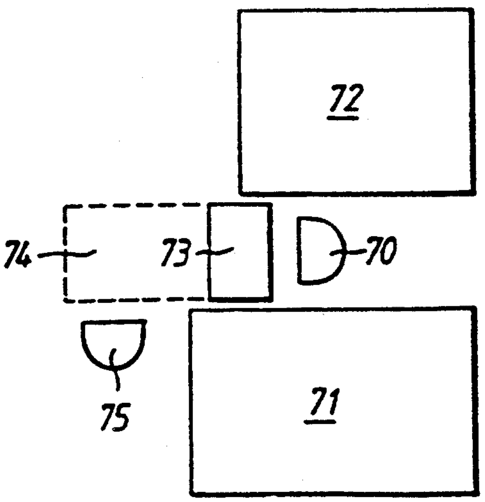
FIG. 12 is a diagrammatical plan view of an operating station.

In Column 4, between lines 31 and 32, insert the following:

---Figure 10A is an enlarged area of that portion of Figure 10 defined generally by the circle designated as "Fig. 10A";---.

Figure 13:
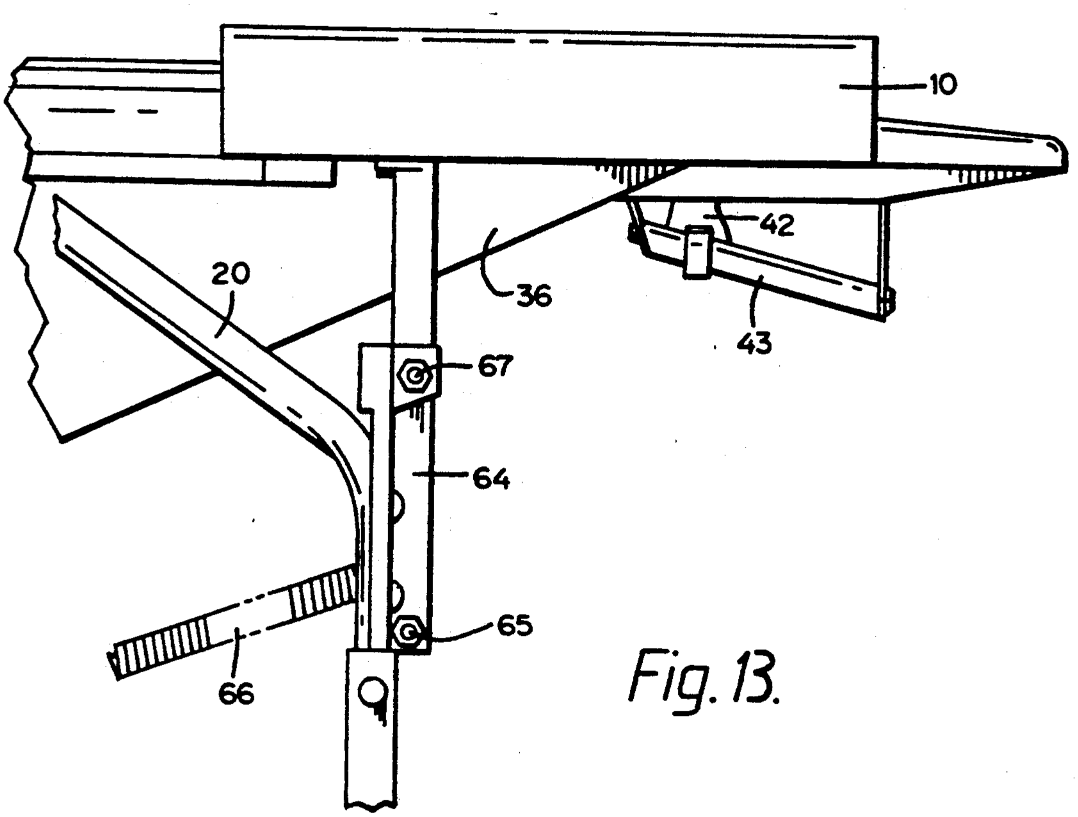
FIG. 13 shows how the structure of FIG. 9 is used to lower the patient's head during an emergency.
Figure 13A:
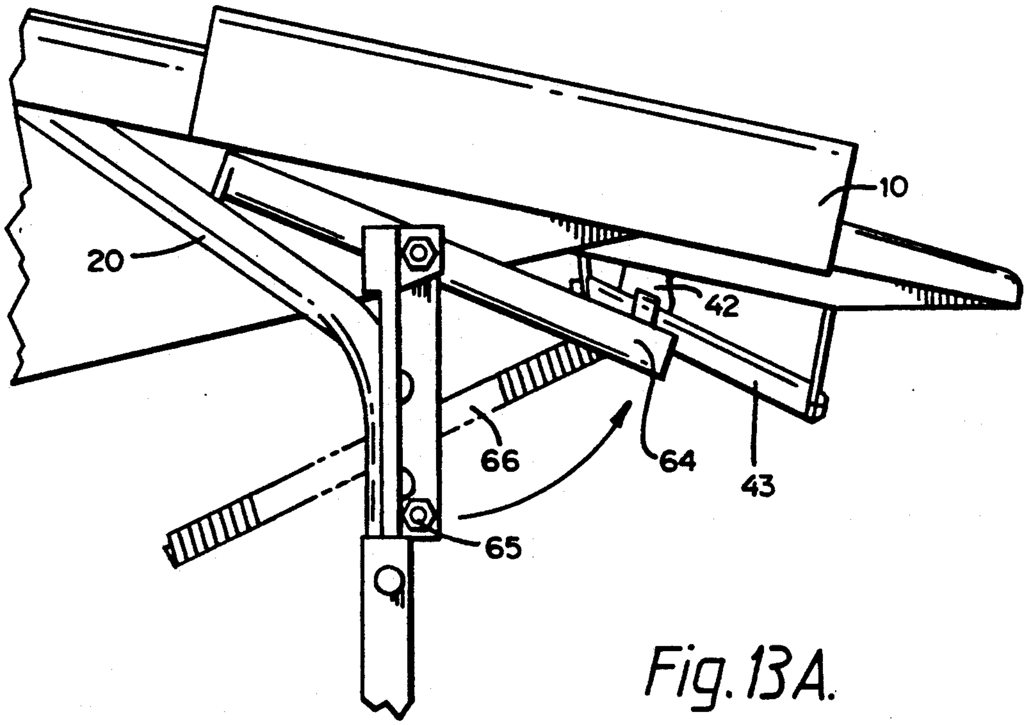

In Column 4, after line 37, insert the following:

---Figure 13A is an enlarged area of that portion of Figure 13 defined generally by the circle designated as "Fig. 13A".---.

Signed and Sealed this

Fifteenth Day of March, 1994

Attest:

BRUCE LEHMAN

*Attesting Officer* *Commissioner of Patents and Trademarks*